United States Patent [19]
Gish

[11] Patent Number: 5,852,988
[45] Date of Patent: Dec. 29, 1998

[54] ANTI-TANGLE/TWIST MULTI-PET WALKING-LEASH

[76] Inventor: Panje L. Gish, 10276 Rue Chamonix, San Diego, Calif. 92131

[21] Appl. No.: 504,150

[22] Filed: Jul. 19, 1995

[51] Int. Cl.⁶ .................................................... A01K 27/00
[52] U.S. Cl. .............................................................. 119/795
[58] Field of Search .................................. 119/769, 792, 119/795, 793, 797, 798

[56] References Cited

U.S. PATENT DOCUMENTS

| | | | |
|---|---|---|---|
| 2,737,154 | 3/1956 | Michonski | 119/798 |
| 2,827,017 | 8/1958 | Ryan | 119/109 |
| 2,909,154 | 6/1959 | Thomas | 119/109 |
| 3,120,403 | 2/1964 | Molzan | 294/74 |
| 3,311,088 | 3/1967 | Peterlin | 119/793 |
| 3,752,127 | 8/1973 | Baker | 119/109 |
| 3,884,190 | 5/1975 | Gurrey | 119/109 |
| 4,563,981 | 1/1986 | Kramer | 119/96 |
| 4,879,972 | 11/1989 | Crowe et al. | 119/792 |
| 4,892,063 | 1/1990 | Garrigan | 119/109 |

FOREIGN PATENT DOCUMENTS

| | | | |
|---|---|---|---|
| 26249 | 2/1912 | United Kingdom | 119/795 |
| 2039705 | 8/1980 | United Kingdom | 119/795 |

*Primary Examiner*—Thomas Price
*Attorney, Agent, or Firm*—Brown, Martin, Haller & McClain, LLP

[57] ABSTRACT

A specially configured leash providing a user the ability to conveniently secure and walk two or more dogs from a single handle member, without encountering the usual frustration of an impossibly intertwined melee. Set forth is a special combination assembly of swivels, for anti-tangle/anti-twist of the leashes, each leash having provision for a detachable sub-leash member having a discrete "free-floating rotary-action" with respect to the like cooperatively associated leashes. The handle essentially includes a primary swivel-ring of size to receive two snap-hooks of multipul leashes arranged either in "series" or in "dual-series". In series, a first/sub-leash is connected to the swivel-ring of a sub-leash, a second/sub-leash is connected to the swivel-ring of the first/sub-leash, a third/sub-leash is connected to the swivel-ring of the second/sub-leash, etc. . . . In the alternate "dual-series" arrangement, -a first/sub-leash is connected to the swivel-ring of the first-leash, and a second/sub-leash is connected to the swivel-ring of the second-leash, each of the two original leashes being thus added to separately. The apparatus enabling dogs of different sizes to virtually walk around/over/under each other without necessitating the walker constantly disconnect, untangle, and reconnect, the respective leashes in order to resume orderly walking.

15 Claims, 1 Drawing Sheet

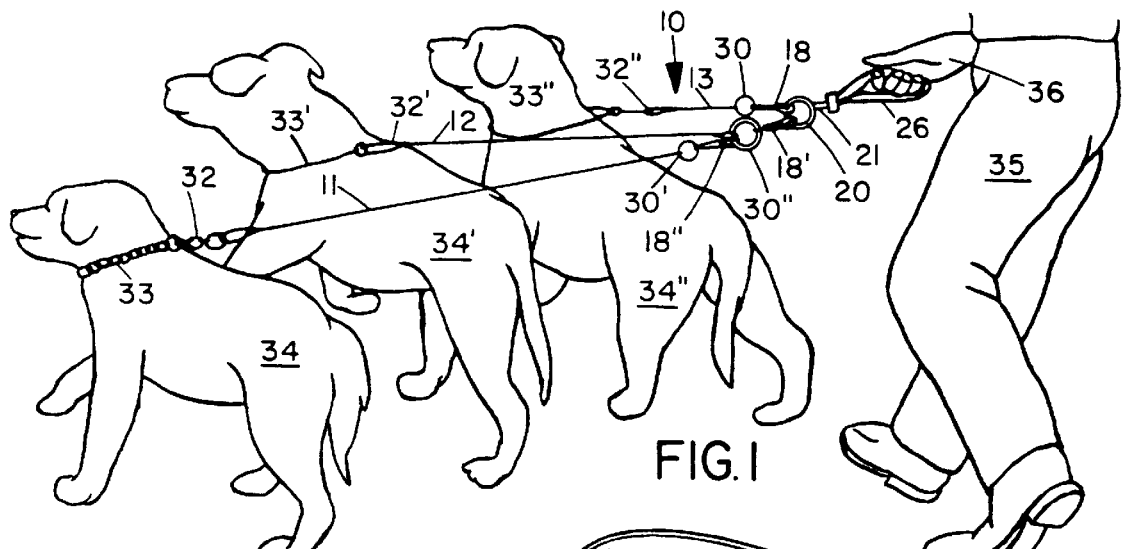
FIG. 1
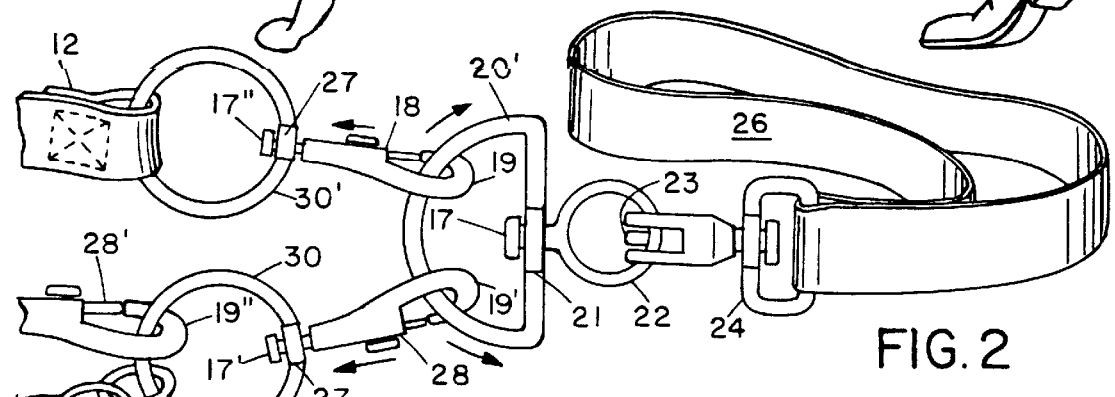
FIG. 2
FIG. 4
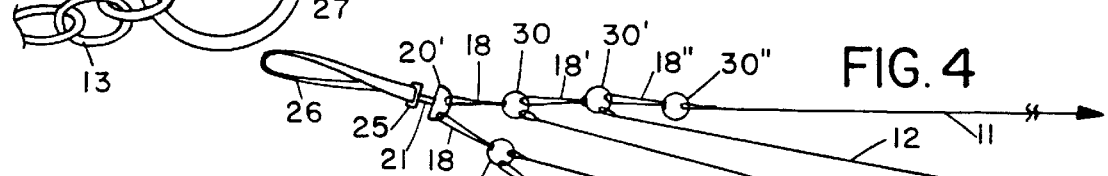
FIG. 3
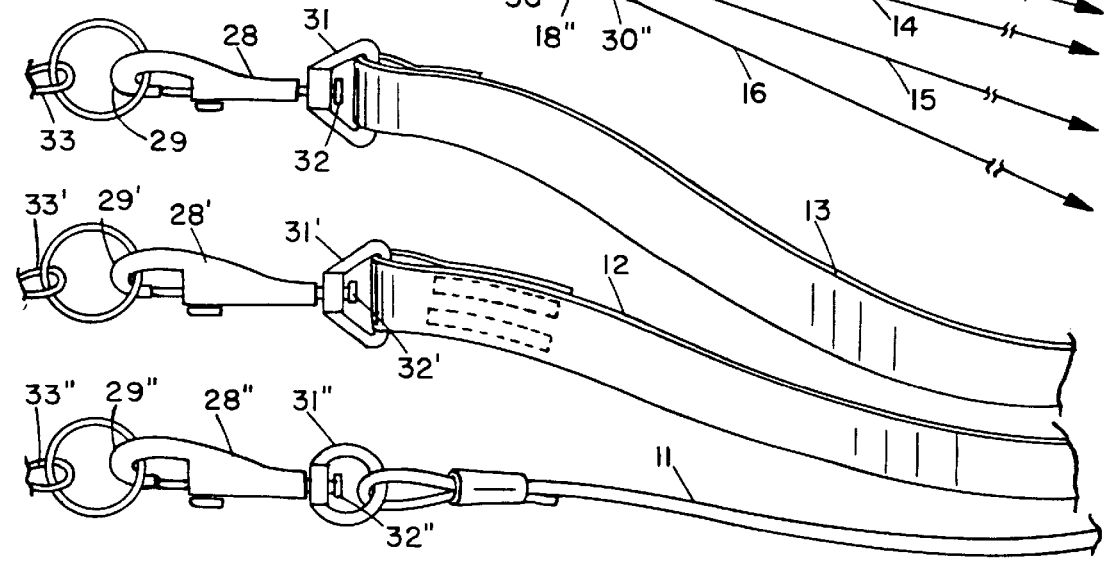

5,852,988

ANTI-TANGLE/TWIST MULTI-PET WALKING-LEASH

I.) PROBLEMATICAL BACKGROUND OF RELEVANT EARLIER INVENTION

This invention relates to pet walking-leashes, and more specifically it relates to those types of leashes facilitating control of one or more pets, most generally a dog.

Background research discovery provides some prior patent-art regarded as germane to this disclosure, chronologically for example U.S. Pat. No. 2,827,017(Filed: August/1955) shows a dog leash having snap-hooks arranged at both extreme opposite ends; a first snap-hook being attached outwardly to the dog's collar, a second snap-hook arranged at the opposite end of the leash being capable of forming a loop portion serving as a walking handle when that second snap-hook is secured to a D-ring integrally formed on the leash a short distance from the second snap-hook. There is no contemplation for tangle-free walking of two dogs therefrom.

In U.S. Pat. No. 2,909,154(Filed: June/1956) is also shown a dog leash having snap-hooks arranged at both extreme opposite ends; a first snap-hook being attached outwardly to the dog's collar, the second snap-hook being attached inwardly to a D-ring permanently secured to an adjustable-belt encircling a car's seatback. Also included at the inward-end of the leash is a loop portion serving as a walking handle; but there is no provision for walking two dogs in a tangle-free manner.

In U.S. Pat. No. 3,120,403(Filed: June/1961) a cargo-sling apparatus for a helicopter is shown; including a ring portion, from which a plurality of leash like adjustable-straps depend. Each of the straps is secured to the ring portion by being looped there around and sewn to itself, while remaining slidable about the ring. There is no contemplation for tangle-free operation.

In U.S. Pat. No. 3,752,127(Filed: November/1971) also shows a dog leash having snap-hooks arranged at both extreme opposite ends; a first snap-hook being attached outwardly to the dog's collar, a second snap-hook arranged at the opposite end of the leash where is formed a loop portion serving as a walking handle. When the second snap-hook is optionally secured to a D-ring integrally formed on the leash a short distance from the first snap-hook, the leash length is thereby effectively halved to provide a much shorter walking leash. There is no contemplation for tangle-free walking of two dogs therefrom.

In U.S. Pat. No. 3,884,190(Filed: May/1975) a dog leash is shown having snap-hooks arranged at both extreme opposite ends; a first snap-hook being attached outwardly to the dog's collar, a second snap-hook arranged at the opposite end of the leash where it is formed in a loop portion to serve as a walking handle. The outward snap-hook includes a swivel-eye portion, while a swivel-eye with a D-ring is also included inward near the handle so that when the second snap-hook is secured to the D-ring portion, the outwardly extending leash portion may rotate freely relative to the handle. Additionally, a tempered-steel wire is integrated into the length of the leash, so as to effect a recoiling spring action. There is no contemplation for tangle-free operation relative to any other hand leash.

In U.S. Pat. No. 4,563,981(Filed: November/1984) a D-shaped handle is shown having a plurality of leashes dependent there from; thereby providing a group tether apparatus said suitable for imparting directional walking control to children spaced at regular intervals grasping it's leash like length. There is no contemplation for tangle-free operation.

Finally, in U.S. Pat. No. 4,892,063(Filed: January/1985) a leash apparatus for at least two dogs is shown, wherein a single length of leash strap is passed through a sleeve like hand-grip member. Snap-hooks with swivel-eyes are included at the opposite ends of the U-shaped leash, thereby facilitating discrete attachment to two dogs relative to the single sleeve/hand-grip. A D-ring is included mid-length of the double-ended primary leash, whereby one or two additional leashes may be snap-hooked thereto if desired. However, there is no contemplation for tangle-free operation.

Therefore, in full consideration of the preceding patent review, there is determined a need for an improved form of device to which these patents have been largely addressed. The instant inventor hereof believes their newly improved multi-pet leash device, commercially referred to as the Panje/MULTIPET-WALKER™, currently being developed for production under auspices of the Panje-Mfg./Mkt.Co., exhibits certain advantages as shall be revealed in the subsequent portion of this instant disclosure.

II.) SUMMARY OF THE INVENTION

A.) In view of the foregoing discussion about the earlier invention art, it is therefore important to make it pellucid to others interested in the art that the object of this invention is to provide a walking leash capable of accommodating more than one pet in a manner very resistant to entanglement of their respective individual leash leads. With the new multi-pet walking-leash one may confidently proceed with their pets, -walking, stopping, intermingling, and even crossing over of one pet relative to another. Such is the common interaction between the controlling walker and active animals coupled thereto, which with conventional leash apparatus results in the walker having to frequently stop to untangle the confusingly entangled array of leashes.

B.) Another object of this invention disclosure is to set forth a special anti-tangle multipul-pet leash apparatus made of any conventional leash type linear material, such as nylon webbing, leather strap, chromed chain, or plastic clad metal cable. A substantially conventional flexile closed loop type handle portion for secure hand control by the walker, includes a primary swivel-eye member permanently joined thereto. This swivel-eye member is preferably a metal D-ring or substantially equivalent metal O-ring of sufficient size as to spatially accommodate attachment of one, two, three, or more discrete sub-leashes in restraint of one's pets (which in this application are generally domestic dogs). This special handle configuration with it's primary swiveling-ring member, in combination with special individual leashes, each having a snap-hook with a secondary swiveling-ring included at their inward distal end, -thereby constitutes the primary invention.

C.) Another object of this invention disclosure is to set forth a multipul-pet leash apparatus wherein the special anti-tangle combination given in preceding item-B is further defined by arranging three or more leashes coupled in "series" or in "dual-series". The primary swivel-ring device functions perfectly when only two dogs are being walked, in as much as both leashes are free to gyrate with respect to one another. However, introduction of a third dog's leash requires that the third leash be employed as a sub-leash, whereby the snap-hook of the third leash must be attached not to the primary swivel-ring, but instead to a secondary swivel-ring rotating upon the snap-hook of one of the two leashes connected upon the primary swivel-ring. Accordingly, a forth leash (2nd/sub-leash) may be connected in either series or dual-series arrangement to the aggregation. A so called series connection is realized by connecting the snap-hook of the forth leash upon the swivel-ring of the third leash. A so called duplex connection arrangement is attained by connecting the snap-hook of the forth leash upon the swivel-ring of the original second leash. In other words, a series connection arranged for six dogs, would find five sub-leashes, each dependent from the swivel-ring of the preceding snap-hook. While a duplex arrangement for six dogs would find two sub-leashes dependent from the swivel-rings of the first original dog leash, plus two more sub-leashes dependent from the swivel-rings of the second original dog leash attached to the primary swivel-ring at the handle.

While the primary swivel-eye provided at the handle portion is absolutely essential to the advantageous operation of this leash invention, it is also desirable to include a secondary swivel-eye at the outward snap-hook end of each leash, because this optional provision helps negate possible intra-twisting of those individual sub-leashes.

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature; wherein:

FIG. 1, is a pictorial view depicting the invention in normal use by the walker in control of three exemplified dogs;

FIG. 2, is a greatly enlarged detail view of the special handle portion where it is coupled with three exemplified sub-leashes which are fragmentary in that they are abbreviated owing to spatial considerations;

FIG. 3, is an additional abbreviated fragmentary view showing further preferred features of the same sub-leash members set forth in FIG. 2.

FIG. 4, is a semi-diagrammatic fragmented plan-view representation, demonstrating how still additional multipuls of sub-leash units are accomodated.

IV.) ITEMIZED NOMENCLATURE REFERENCES

10—overall invention array
11—sub-leash
12—leash
13—leash
14—leash
15—sub-leash
16—sub-leash
17/17'/17"—swivel-eyelet shank-terminuses
18/18'/18"—inward snap-hook
19/19'/19"—snap-hook's finger
20, 20'—primary O-ring, D-ring
21—primary ring swivel-eye
22—handle release-ring (optional)
23—quick-release fingers (optional)
24—handle swivel-eye (optional)
25—handle buckle
26—handle loop
27/27'/27"—inward snap-hook/swivel-ring eyelets
28/28'/28"—outward snap-hooks
29/29'/29"—outward snap-hook fingers
30/30'/30"—inward snap-hook swivel-rings
31—outward snap-hook swivel-buckles
32/32'/32"—outward snap-hook swivel-eye terminuses
33/33'/33"—existing dog-collars
34—exemplified pet dogs
35—walker person
36—walker's hand

V.) DETAILED DESCRIPTION OF THE PREFERRED EMBODIMENTS

Initial reference is given by way of FIG. 1, wherein is exhibited the overall invention 10 depicted with an exemplified multiplicity of pet dogs 34/34'/34", shown here leading their walker 35 in a right to left direction. Note how by virtue of the size of the collective leash ring 20, the walker 35 can simultaneously control by a single hand 36 a plurality of individual discrete dog leashes 12, 13, and sub-leash 11, without difficulty. -Particularly since the single preferably loop type handle 26 incorporates a swivel-eye device 21 capable of continuous rotation on a shank-axis proximally colinear with the general directional orientation of the leading leashes 12,13, and sub-leash 11. The basic singular apparatus thus serves to enable the user to add or delete still other sub-leashes in doubling series as desired, in quick and easy manner, without confounding the ability of the apparatus to automatically compensate for heretofore entangling activity of the pets. The basic leash apparatus is preferably sold as a duplex system (two basic co-depending leashes), whereupon plural individual sub-leashes may be added or subtracted in the duplex-dependent(never more than two hooks per swivel-ring) plural manner as need be.

Reference to FIG. 2 reveals in greatly enlarged detail the special combination of a generously sized D-ring 20', and the accompanying swivel-eye device 21 having fixed shank-terminus 17, which cooperate to defeat heretofore perplexing entanglement of the individual exemplified leash lines 11,12,13, of FIG. 1. Note while the metal D-ring configuration exhibited in FIG. 2 is preferred, the equivalent sized rigid O-ring device of FIG. 1 will suffice as well. Included in FIG. 2 is the additional convenience option of a conventional quick-release catch device of the type here incorporating bifurcated fingers 23, which can be readily tripped in the event that the walker 35 desires to let all the dogs run together in a suitable open space; this can be a safety release as well in some instances. A secondary swivel-eye device 24 is also indicated, but it is not essential to the reliable operation of the anti-tangle function. In general, the leash material is attached to the hardward members via a traditional secured loop; -that is, it is wrapped around a buckle like portion and sewn there permanently upon itself. There remain subtle, however vital other differences which are to become herein more evident and understood as important provisions.

For example, fragmentary FIG. 2 shows how another desirable provision is that of swivel-eyes 17'/17" joined with the respective leases 12",13", and respective secondary/snap-hook devices 18/18', each having integral respective finger portions 19/19' thereto. This swivel-eye provision gives the additional advantage of an anti-twist function, to effectively abate tendency toward intra-twisting of sub-leash units.

Study of fragmentary FIG. 3 reveals how it is optionally preferred that both ends of these sub-leashes include swivel-eyes, thereby further enhancing resistance to intra-twisting. Note the opposite outward lead end members 11',12',13' of the three leashes exemplified in FIGS. 1 & 2, including fragmented portions of the three discretely separate dog-collars 33/33'/33", the primary feature of importance being the optional provision of additional outward/snap-hooks 28,28',28", preferably including swivel-eyelets 27,27',27" respectively, which aid in negating intra-twisting of the individual leashes and sub-leashes. Note also that the outward end of sub-leash portion 11 is shown as a plastic covered cable type leash, such as is depicted in FIG. 1 with all three of the sub-leashes; -the object being to demonstrate that the invention thus functions successfully with virtually any type of known leash material. Nor is the length of the sub-leash critical to the proper operation of the invention, although many local ordinances now impose a legal overall length of 6-feet, as measured from finger 29 of snap-hook 28 (FIG. 3) to the inward terminus loop of handle 26 (FIGS. 1 & 2).

Accordingly, it can be understood that by virtue of the special collective handle ring member 20, in combination with the strategically located continuously rotational primary swivel-eye units 21(essential) and 17(optional); -that even the most sprightly of animals, which may excitedly intermingle in the most confusing of ways, cannot result in entanglement of the individual leash leads (which may be from two to five or more for example).

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended Claims set out the scope of the invention sought, and are to be construed as broadly as the terminology therein employed permits, reckoning that the invention verily comprehends every use of which it is susceptible. Accordingly, the embodiments of the invention in which an exclusive property or proprietary privilege is claimed, are defined as follows.

VI.) What is claimed of proprietary inventive origin is:

1. A special anti-tangle multi-pet walking leash apparatus, whereby pets coupled thereto may pursue activity heretofore causing disabling entanglement; comprising the combination of:

a conventional loop type handle portion, said handle including a primary swivel-ring member from which an attachable inward snap-hook of a leash can be dependent, said leash member and said handle member being made of any conventional leash type material; said inward snap-hook being joined to an outward snap-hook member attachable to a pet's existing collar.

2. An anti-tangle multi-pet walking leash apparatus, whereby pets coupled thereto may pursue activity heretofore causing disabling entanglement; comprising the special combination of:

a conventional loop type handle portion including a primary swivel-ring means of sufficient size as to accommodate a duplex arrangement of manually attached discrete inward snap-hooks dependent therefrom, each said inward snap-hook including a secondary swivel-ring means for optional manual attachment of up to two sub-leashes thereto, both said secondary swivel-rings including a discrete flexile leash portion oppositely bearing an outward snap-hook for attachment to a separate existing pet collar.

3. The invention apparatus according to claim 2, wherein said leash portion include a tertiary/swivel-eye joined between an outward/snap-hook and an outermost portion of a leash strap, thereby abating intra-twisting of sub-leash units.

4. The invention apparatus according to claim 2, wherein said sub-leash members include a tertiary/swivel-eye joined between an outward/snap-hook and an outermost leash strap portion; thereby abating tendency toward intra-twisting of sub-leash units.

5. The invention apparatus according to claim 2, wherein said handle portion includes a quick-release attachment to said swivel ring means.

6. The invention apparatus according to claim 2, wherein said handle portion can be fabricated from any conventional leash linear flexile material.

7. The invention apparatus according to claim 2, wherein said leash portion can be fabricated from any conventional leash linear flexile material.

8. The invention apparatus according to claim 2, wherein said leash flexile portion can be fabricated from any conventional linear material.

9. An anti-tangle multi-pet walking leash, whereby pets coupled thereto may pursue activity heretofore causing disabling entanglement; comprising the combination of;

a conventional handle portion for hand control by the pet walker, said handle portion including a primary swivel-ring serving to receive up to two conventional attachable snap-hooks dependent therefrom;

an inward snap-hook attached to said primary swivel-ring and outwardly including a second swivel-ring affixed to a conventional flexile leash portion having an outward snap-hook member for manual attachment to an existing pet's collar;

an inward snap-hook attached to said primary swivel-ring and outwardly including a conventional flexile leash having an opposite outward snap-hook for manual attachment to an existing pet's collar;

said second swivel-ring capable of likewise receiving up to two additional sub-leashes for discrete manual attachment of other existing pet's collars.

10. The invention apparatus according to claim 9, wherein said leash includes a tertiary swivel-eye joined between said outward snap-hook and outermost portion of said leash; thereby abating intra-twisting of sub-leash units.

11. The invention apparatus according to claim 9, wherein said sub-leash members comprise a conventional hand held leash device including a tertiary swivel-eye joined between said outward snap-hook and the outermost said leash portion; thereby abating intra-twisting of sub-leash units.

12. The invention apparatus according to claim 9, wherein said handle member includes a quick-release attachment to said swivel ring means.

13. The invention apparatus according to claim 9, wherein handle portion can be fabricated from any conventional leash linear flexile material.

14. The invention apparatus according to claim 9, wherein leash portion can be fabricated from any conventional leash linear flexile material.

15. The invention apparatus according to claim 9, wherein said leash flexile portion can be fabricated from any conventional linear material.

\* \* \* \* \*